Figure 1:
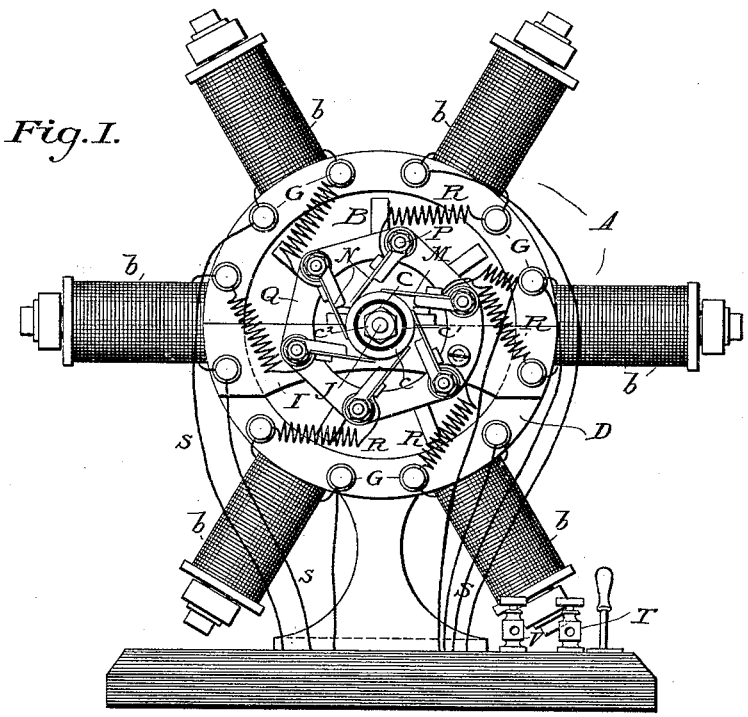

(No Model.) 3 Sheets—Sheet 1.

J. S. LOSCH.
ELECTRIC MOTOR.

No. 526,016. Patented Sept. 11, 1894.

Witnesses: Inventor.
Raymond H. Barnes. John S. Losch
N. R. Kennedy By W. Hunter Myers
Attorney.

(No Model.) 3 Sheets—Sheet 2.

J. S. LOSCH.
ELECTRIC MOTOR.

No. 526,016. Patented Sept. 11, 1894.

on line x—x.

Witnesses: Inventor.
Raymond F. Barnes John S. Losch
N. R. Kennedy By Wm. Hunter Myers,
 Attorney.

(No Model.)  3 Sheets—Sheet 3.
J. S. LOSCH.
ELECTRIC MOTOR.
No. 526,016. Patented Sept. 11, 1894.
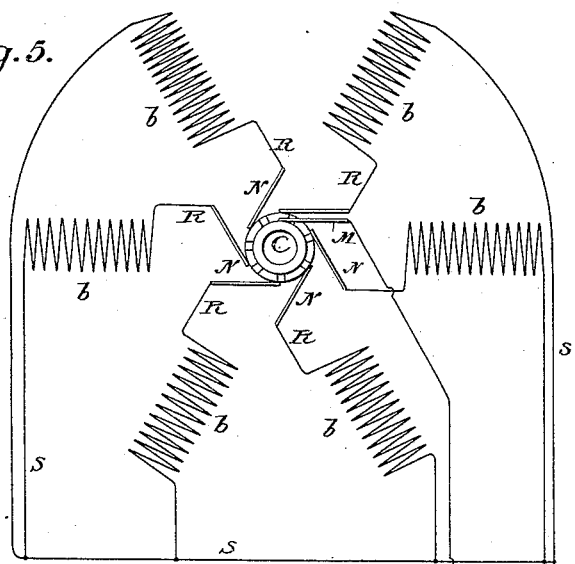
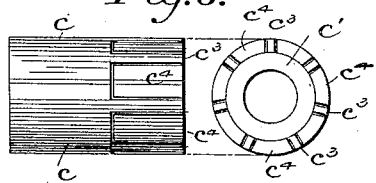
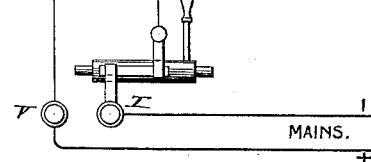
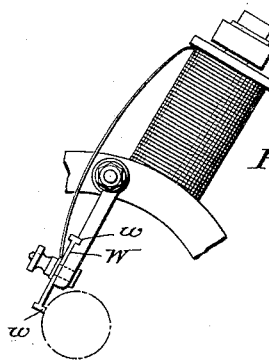
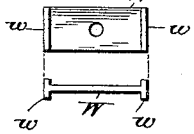
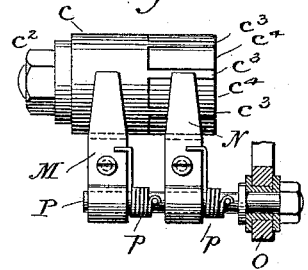
WITNESSES:
Raymond H. Barnes
N. R. Kennedy
INVENTOR,
John S. Losch,
BY
Wm Hunter Myers,
ATTORNEY.

UNITED STATES PATENT OFFICE.

JOHN S. LOSCH, OF SUMMIT STATION, PENNSYLVANIA.

ELECTRIC MOTOR.

SPECIFICATION forming part of Letters Patent No. 526,016, dated September 11, 1894.

Application filed March 6, 1894. Serial No. 502,471. (No model.)

*To all whom it may concern:*

Be it known that I, JOHN S. LOSCH, a citizen of the United States, residing at Summit Station, in the county of Schuylkill and State of Pennsylvania, have invented certain new and useful Improvements in Electric Motors, of which the following is a specification, reference being had therein to the accompanying drawings.

My invention relates to electric motors of that class in which a series of radial armatures carried by a revolving shaft is caused to rotate in the field produced by a series of electro-magnets, the said electro-magnets being energized in succession through the action of a commutator carried by the armature-shaft in such manner that a series of impulses shall be exerted upon the radial armatures in the direction of rotation of the shaft, and the arrangement of the parts being such that the total number of impulses so acting upon the armature during one revolution shall be equal to the number of field-coils multiplied by the number of armature-sections.

The invention is mainly directed to the novel arrangement of the commutator with relation to a series of brushes bearing thereon and connected to the field-coils, by means of which the active or effective point of the magnetic field is caused to rotate in the same direction as the armature and at a rate of speed greatly in excess of the same, by which construction a series of impulses is exerted upon the armature greatly in excess of the number of field-coils, and the speed of rotation and efficiency of the machine as regards power are greatly increased.

The invention consists, therefore, in the details of construction and combination of parts, by means of which the results above outlined are obtained, and which will be more fully developed in the following description, in which connection it will be understood that while I have shown and described what I deem to be the best and most efficient manner of carrying my invention into practical operation, many modifications might be devised in which the mechanical construction might be changed to embody the same ideas in a varying form, and that such modifications would be substantially equivalent of the invention shown.

Figure 2:
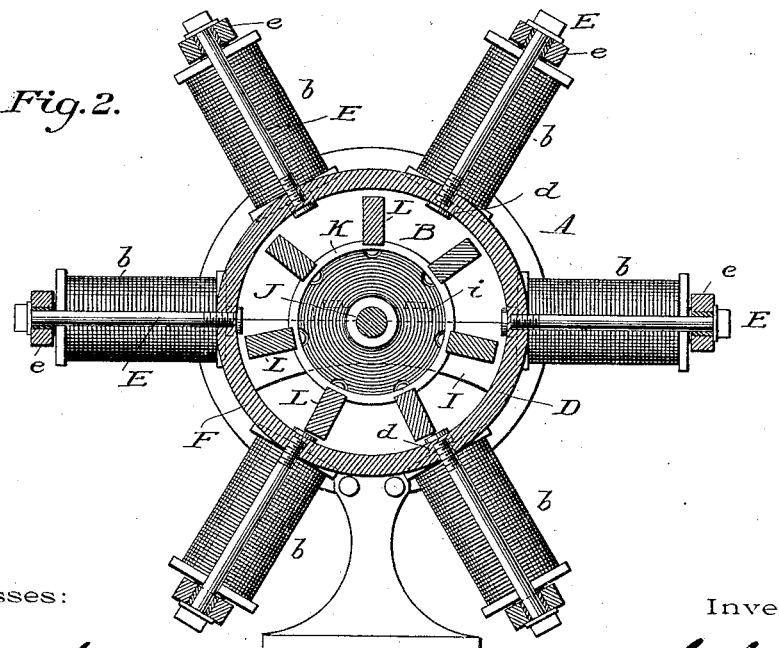
Figure 3:
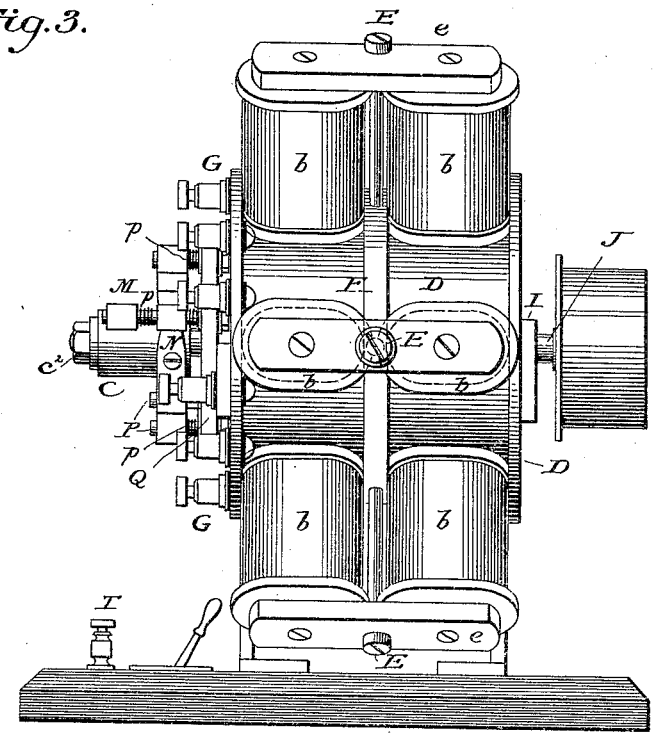
Figure 4:
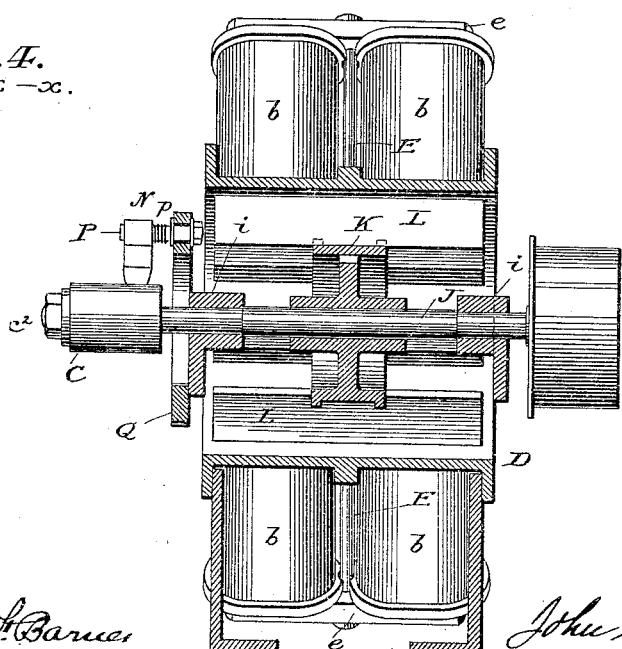

Referring now to the drawings which accompany the specification: Figure 1 is an elevation of the machine from the front or commutator end. Fig. 2 is a vertical cross-section through the field and armature, illustrating the manner of supporting the field-coils and the construction of the armature. Fig. 3 is a side elevation of the machine. Fig. 4 is a vertical longitudinal section on the line $xx$ of Figs. 1 and 2. Fig. 5 is a diagram illustrating the winding and connections of the machine. Fig. 6 is a detail of the commutator. Fig. 7 is a modified form of brush-holder and connections. Fig. 8 is a detail view of one of the brushes. Fig. 9 is a detail view, showing the plan of the commutator, with the leading-in brush and one of the distributing-brushes in position.

The machine consists, as usual in machines of this class, of a field A, an armature B mounted to revolve therein, and a commutator C. As shown in Figs. 1 and 2, the field consists of a series of six electro-magnets $b$ $b$, &c., mounted at equal distances upon a shell or casing D, in such manner as to project radially therefrom. These magnets are of the double or horse-shoe type, and their poles are arranged to enter openings $d$ in the shell or casing D, the poles when in position being in operative relation to the armature, which rotates within the casing. The magnets are secured in position by screw-threaded rods E, which pass through the magnet-yokes $e$ and are seated in an annular rib F formed on the outer surface of the casing D. Each pair of magnets are wound in such manner as to produce consequent poles to influence the armature-section, and the free ends or terminals of their coils are brought out and secured to a series of binding-posts G G mounted in and insulated from an annular rib or flange H formed upon the end of the casing D, these binding-posts being connected to the commutator-brushes and the outgoing main, as will be hereinafter described.

At each end of the casing and extending across the same is secured a bracket I, provided with a bearing $i$ adapted to receive a shaft J. Between the brackets and upon the shaft, is secured a hub K, of nonmagnetic material, to which is secured a series of seven soft-iron bars L, extending longitudinally inside the shell D, from end to end thereof, in such position as to revolve in close proximity to the inwardly-projecting poles of the magnets b b. It will be noted in connection herewith that the arrangement of seven armature-sections in connection with six field-magnets results in a condition in which one of the armature-sections is continually in a position of greatest efficiency in relation to one of the field-coils, and that this point of greatest efficiency travels around the ring in the direction of rotation of the armature at a much higher speed than the speed of rotation of the armature, the speed at which such effective point travels being dependent on the numerical relation of the armature-sections to the field-coils. In order to utilize this point of greatest efficiency, the effective magnetic field is caused to rotate in time therewith by a special arrangement of commutators and connections, the field being always slightly in advance of the armature, and therefore exerting a direct tangential pull thereon.

Referring to Figs. 1 and 6 of the drawings, which illustrate more particularly the construction of the commutator and the arrangement of its connections, the commutator C consists of a cylindrical shell c, of conducting material, mounted upon the shaft, from which it is insulated by a fiber sleeve c', and upon which it is secured by a nut $c^2$. The forward end of the conducting-shell c is continuous and forms a contact surface, upon which rests a brush M, by which the current enters the machine. At its rear end the shell c is divided into a series of distributing sections $c^3$, equal in number to the number of armature-sections, in this case seven, separated by insulating spaces $c^4$, or by blocks of insulating material therein, the fractional portion of the circumference of said shell occupied by each of the distributing-sections being represented by the product obtained in multiplying the number of field-magnets by the number of armature-sections. The commutator, at its divided or distributing point, has resting upon it, at equal distances around its circumference, a series of brushes N, one for each field-coil, by means of which the current is transmitted to the field-coils in succession as the commutator is revolved.

The brushes N are mounted preferably as shown in Fig. 1, each being secured to an arm O pivoted upon an insulated pin P mounted upon a ring Q secured upon the front bracket of the machine. Each pin P is surrounded by a spiral spring p, one end of which is secured thereto, the free end resting upon the back of the brush and exerting a pressure upon the same, by which a good contact with the surface of the commutator is insured. To each of the brushes a connection R is fastened, the other end of which is secured to one of the binding-posts G, forming a terminal of the field-coil. The other ends of the field-coils are connected, as shown, by wires S leading to a common binding-post T, mounted upon the base of the machine, to which the outgoing main is secured. I may, and preferably do, interpose a switch in either the incoming or outgoing main, by means of which the machine may be cut out of circuit. I prefer also to lead a wire from the brush M to a second binding-post V mounted upon the base of the machine adjacent to the post T.

Referring to Figs. 7 and 8, which show a modified form of brush-holder and brush, W is a brush, consisting of a plate, preferably of copper, provided at each end with projecting lips or flanges w, such flanges forming the contact-surfaces, which rest upon the commutator, and a retaining-rib, which rests, when the brush is in place, within a slot formed in the brush-holder, whereby the brush is held more securely in place. The brushes are secured to the holder by a single bolt, to which a conductor may be secured. The other end of the brush-holder I prefer to pivotally secure to a binding-post mounted upon and insulated from the casing D, and carry the connection from the brush direct to the field-coils.

While I have in this case shown and described a machine in which six field-coils are combined with an armature of seven sections, and a commutator with seven sections and six brushes operating in connection therewith, it is obvious that these proportions may be changed and varied at will without materially affecting the resulting machine as regards the principle or operation, and that all such modifications are comprehended within the scope of this invention.

Having thus described my invention, what I claim as new, and desire to secure by Letters Patent, is—

1. In an electric motor, the combination, with a series of field-magnets and a series of armatures, of a commutator composed of a cylindrical shell, one end of which is divided into a number of distributing sections equal to the number of armatures, the fractional portion of the circumference of the shell occupied by each of said sections being represented by the product obtained in multiplying the number of field-magnets by the number of armatures.

2. In a motor of the kind described, the combination of a non-magnetic casing having a series of openings formed therein through which the poles of a series of magnets mounted thereon project, an armature mounted upon a shaft revoluble within the casing, a commutator provided with a continuous ring through which current is received and distributing-sections through which current is distributed to the coils in series, and brushes resting upon the distributing-sections and connected to the field-coils in such manner as to cause a change in location of the effective point of the magnetic field in response to and at a higher speed than the revolution of the armature.

3. In a motor of the kind described, the combination of an armature composed of a series of soft-iron bars, an annular non-magnetic casing surrounding said armature and provided with a series of openings, field magnets mounted upon the casing with their poles projecting through the openings into operative relation to the armature, and means whereby the magnetic field may be caused to rotate in the direction of armature travel and at a higher speed than the same and the point of highest efficiency between the field magnets and armature utilized.

4. In an electric motor, the combination of an armature, an annular non-magnetic casing surrounding the same, openings in the casing, magnets carried by yokes secured to their outer ends and with their inner ends projecting through the openings in the casing, and bolts passed through the yokes and seated in the casing, by which the magnets are retained in place, substantially as described.

5. In an electric motor, the combination, with a commutator, of a brush provided with ribbed or flanged ends, whereby a greater wearing surface is provided and the brush is more readily retained in position.

6. In an electric motor, the combination, with a commutator-brush ribbed or flanged at its ends and perforated at its center, of a holder correspondingly grooved and perforated, a retaining-bolt whereby the brush is retained in position, means for holding the brush in operative relation to the commutator, and a spring whereby the pressure may be determined, substantially as described.

In testimony whereof I affix my signature in presence of two witnesses.

JOHN S. LOSCH.

Witnesses:
WM. HUNTER MYERS,
G. W. BALLOCH.